2,857,417
p-AMINOBENZOIC ACID ESTERS OF POLY-ALKYLENE OXIDE ETHERS

Max Matter, Worb, near Bern, and Albert Kobler, Guemligen, near Bern, Switzerland, assignors to Ciba Pharmaceutical Products Inc., Summit, N. J.

No Drawing. Application July 12, 1955
Serial No. 521,632

Claims priority, application Switzerland July 13, 1954

10 Claims. (Cl. 260—471)

This invention relates to esters of benzoic acids substituted in the para-position by the group Y—NH— with poly-(1,2)-glycols of the formula $$R-O-(C_2H_3-O)_nH$$
$$\quad\quad\quad\quad |$$
$$\quad\quad\quad\quad R'$$

in which $n$ represents a whole number greater than 7, and advantageously 8–16, Y represents an alkyl, oxaalkyl, cycloalkyl or cycloalkylalkyl radical containing 4–7 carbon atoms, and R represents hydrogen or a lower alkyl radical, and in which the radicals R' represent hydrogen, lower alkyl or lower alkoxyalkyl, advantageously methyl, ethyl, methoxy-methyl or ethoxymethyl radicals, and provided that in at least $$\frac{n}{2}$$

and at most $n-1$ groups of the formula

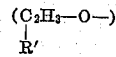

R' represents hydrogen.

In the aforesaid compounds, Y advantageously represents n-butyl, R represents a lower alkyl radical, for example, ethyl, propyl or butyl, but especially methyl, and R' represents hydrogen, methyl, ethyl, methoxymethyl or ethoxymethyl. The benzoic acid radical may be substituted by a free hydroxyl group in ortho-position.

The invention provides more especially compounds of the formula

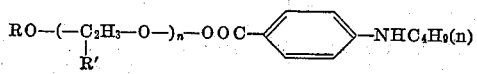

in which $n$ represents a whole number from 8–16, R represents hydrogen or methyl, and the radicals R' represent hydrogen or methyl, ethyl, methoxymethyl or ethoxymethyl, provided that in at least $$\frac{n}{2}$$

and at most $n-1$ groups of the formula

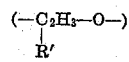

R' represents hydrogen.

The new esters possess valuable pharmacological properties. They exhibit a pronounced anesthetic action and are useful as anesthetics, particularly for relieving coughing. It is noteworthy that the esters generally possess a considerable solubility in water. Their aqueous solutions have the property of becoming turbid when heated to a certain temperature which is dependent on the concentration. This temperature for solutions of 10 percent strength is referred to as the turbidity point, and is a physical constant characteristic of the particular compound. The turbidity phenomenon is reversible, so that upon cooling the solution becomes clear again.

In a preferred embodiment the new esters are made by reacting lower alkyl esters, for example, methyl or ethyl esters of benzoic acids substituted in the para-position by the group —NHY with poly-(1,2)-glycols of the formula

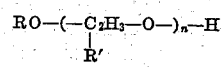

in which Y, R' and R and $n$ have the meanings given above. The reaction is preferably carried out in the presence of a transesterification catalyst, such as an alkaline metal salt of a lower alkanol, for example sodium methanolate or ethanolate. When mixtures of different poly-(1,2)-glycols of different chain lengths or derivatives thereof are used as starting materials, there are obtained poly-(1,2)-glycol ester mixtures in which $n$ has an average value. The invention also includes such mixtures. Such ester mixtures may be purified and separated into their components by known methods, such as counter current extraction or high vacuum or molecular distillation.

The starting materials are known or can be synthesized by methods in themselves known (see, the textbook, "Glycols" by Curme and Johnston, Reinhold Publishing Corporation, New York, 1952). The technically most important starting product for making polyethylene glycols is ethylene oxide

Since the above defined polyether-alcohols are substituted polyethylene glycols, there are also suitable for synthesizing them, for example, especially the following substituted ethylene oxides:

Propylene oxide

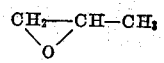

1,2 butylene oxide

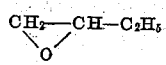

Glycide methyl ether

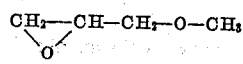

Glycide ethyl ether

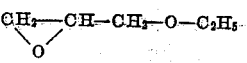

For the synthesis of the polyether-alcohols ethylene oxide may be mixed with one or more of the above epoxides, and copolymerization brought about, advantageously in the presence of a small quantity of water and a catalyst; the molecular proportion of ethylene oxide being at least equal to that of the other epoxides together. In this manner there are obtained copolymers, in which the substituents R' are irregularly distributed. In order to obtain polyether-alcohols, in which the substituents are introduced according to desire in definite numbers at the beginning, in the middle or at the end of the polyethylene glycol chain, the procedure may be as follows: A polyethylene glycol of the formula $$R-O-(-CH_2-CH_2-O-)_n-CH_2-CH_2-OH$$

in which R represents a lower alkyl radical, and $n$ represents a whole number from 2 upwards, is condensed with one of the substituted ethylene oxides defined above, whereby a polyethylene glycol chain is formed which contains substituents only in the end ethylene units:

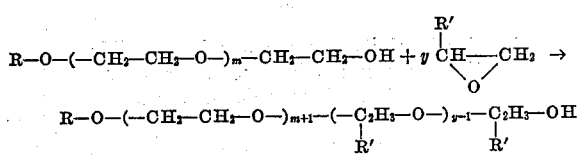

wherein $m$ and $y$ are integers the sum of which does not exceed $n$. If the resulting polyether-alcohol is then condensed with ethylene oxide, there is obtained a polyethylene glycol derivative which contains substituents only in the middle ethylene units

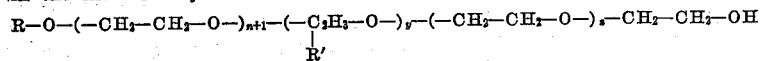

By the use of differently substituted ethylene oxides in succession in several reaction stages the several substituents R' can be distributed in any desired manner in the polyethylene glycol chain. In such a synthesis there may of course also be used as starting material a substituted polyethylene glycol monoalkyl ether

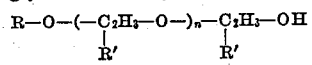

from which there can be obtained by condensation with ethylene oxide a polyethylene glycol chain which contains substituents only in the initial ethylene units. In this synthesis of the polyether-alcohols by the condensation of epoxides there are always obtained mixtures of polyethylene glycol derivatives having different chain lengths. For making the new esters of this invention such mixtures may be used directly, whereby, as indicated above, mixtures of esters are obtained, which likewise differ from one another with respect to the different chain lengths of the polyethylene glycol radicals. A purer, unitary or at least a mixture of polyethylene glycols, the chain length of which is in a smaller range, can be obtained from such a mixture, for example, by distribution between two solvents in a countercurrent extraction apparatus, or by distillation in a high vacuum or by molecular distillation.

In addition to methods of condensation with epoxides, there are other possibilities for snythesizing the ether-alcohols. For example, a reactive ester of an ether-alcohol may be reacted with an alkali salt of an ether-alcohol:

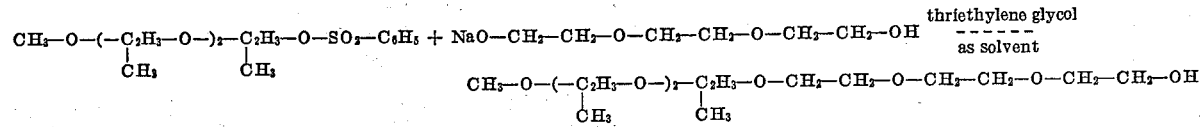

the resulting alcohol esterified with benzene sulfonic acid, and again reacted with the monosodium salt of the triethylene glycol. By this method a very wide variety of poly-(1,2)-glycols can be synthesized, whereby ether-alcohols of unitary chain lengths which are easy to purify are obtained.

The new compounds are useful as medicaments, for example, in the form of pharmaceutical preparations which contain the new compounds in admixture with a pharmaceutical organic or inorganic carrier suitable for enteral, parenteral or oral administration. For making such carriers there come into consideration substances which do not react with the new compounds, for example, water, gelatine, lactose, starches, magnesium stearate, talc, vegetable oils, benzyl alcohols, gums, polyalkylene glycols, petroleum, cholesterol and other known carriers for medicaments. The pharmaceutical preparations may be made up, for example, in the form of tablets, dragees or in liquid form as solutions, suspension or emulsions. If desired, they may be sterilized and/or may contain auxiliary substances, such as preserving agents, stabilizing agents, wetting or emulsifying agents, salts for regulating the osmotic pressure or buffers. They may also contain other therapeutically valuable substances. The preparations can be made up by the customary methods employed in pharmaceutical formulation.

The following examples will serve to illustrate the invention, the parts being by weight unless otherwise stated, and the relationship of parts by weight to parts by volume being the same as that of the gram to the cubic centimeter:

Example 1

2.21 parts of para-(n-butylamino)-benzoic acid ethyl ester and 7 parts of heptaethylene glycol-ω-methylether-ω' - [2 - hydroxy - n - propyl - ether - (1)] are placed in a closed reaction vessel, which is connected to an adjustable inlet for solvent and a connection for distillation in vacuo. In order to dry the products completely they are heated for one hour at 100–105° C., and absolute xylol is introduced beneath the surface of the mixture under a vacuum of 12 mm. pressure of mercury. In this manner a continuous stream of xylol vapour passes through the whole apparatus, and removes the last traces of moisture and other volatile impurities. The xylol is condensed in a condenser. The mixture is allowed to cool somewhat, and 0.02 part of sodium methylate, dissolved in 0.2 part of methanol, is added. Then xylol is again introduced in vacuo at 100–105° C., whereby all the methanol and the ethanol resulting from the reesterification are evaporated. The reesterification is continued under these conditions until a test portion of the reaction mixture dissolves to a clear solution in cold water, which is the case approximately after 2–3 hours. The crude product is distributed several times between benzene and a 2 N-solution of sodium carbonate, and there are obtained from the benzene solution by evaporation and drying in vacuo 5.4 parts of the ester of para-(n-butylamino)-benzoic acid with heptaethylene glycol-ω-methyl ether-ω'-[2-hydroxy-n-propyl ether-(1)] of the formula

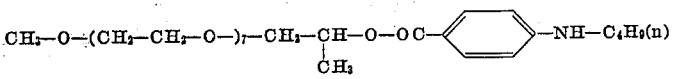

in the form of a pale yellow oil, which dissolves well in water, methanol and ethyl acetate. The ester separates from an aqueous solution of 10 percent strength when heated at a temperature above 34° C. and completely redissolves upon cooling.

By using, instead of heptaethylene glycol - ω - methyl ether - ω' - [2-hydroxypropylether - (1)], for the reesterification nona-ethyleneglycol-ω-methyl ether - ω'-[2-hydroxy - n - propyl ether - (1)], there is obtained the ester of para-(n-butylamino)-benzoic acid with nona-ethyleneglycol - ω - methyl ether - ω' - [2 - hydroxy-n-propyl ether-(1)], which has similar properties and is also soluble in water up to temperatures of about 80° C.

The polyether-glycol used as starting material in this example my be prepared as follows:

530 parts of the benezene sulfonic acid ester of diethylene glycol monomethyl ether is run in the course of 4 hours at 100° C., while stirring, into a solution of 50 parts of sodium in 800 parts by volume of triethylene glycol, and the reaction mixture is maintained at 100° C. overnight. After cooling, 500 parts by volume of water and 100 parts by volume of chloroform are added, and the whole is well shaken. The chloroform layer is extracted twice on each occasion with 250 parts by volume of water, and then evaporated. There remain behind 220 parts of crude pentaethylene glycol monomethyl ether. By extracting five times the three aqueous layers with 500 parts by volume of chloroform on each occasion there are obtained a further 250 parts of crude pentaethylene glycol monomethyl ether. From the crude product there are obtained by distillation under a high vacuum of 0.01 mm. pressure and at 110° C. 400 parts of the pure ether in the form of a colorless oil.

50 parts of pentaethylene glycol monomethyl ether are dissolved in 100 parts by volume of benzene, and 35 parts by volume of benzene sulfochloride are added dropwise in the course of ½ hour, while stirring and cooling to 20–30° C. Simultaneously there are introduced in equal portions 15 parts of pulverized sodium hydroxide. The whole is stirred for a further 2½ hours, and is then allowed to stand overnight without stirring. Precipitated salts are filtered off with suction, and the filtrate is agitated with 20 parts by volume of aqueous ammonia of 25 percent strength for 4 hours. Any benzene sulfochloride still present is thereby converted into the alkali-soluble sulfonamide. 50 parts by volume of caustic soda solution of 10 percent strength are added and the whole is well agitated. The aqueous layer is extracted once more with 150 parts by volume of benzene, and the two benzene extracts are washed in succession with 50 parts by volume of caustic soda solution of 10 percent strength and 50 parts by volume of water. By evaporating the dried benzene solution there are obtained 70 parts of the solvent-free benzene sulfonic acid ester of pentaethylene glycol monomethyl ether in the form of an almost colorless oil.

40 parts of the latter product are introduced dropwise in the course of one hour at 100° C., while stirring, into a solution of 2.3 parts of sodium in 95 parts by volume of diethylene glycol, and the reaction mixture is maintained overnight at 100° C. After cooling the mixture, 250 parts by volume of water are added, and the whole is well agitated with 100 parts by volume of chloroform. The extraction is repeated seven times with 100 parts by volume of chloroform on each occasion, and the chloroform extracts are each washed four times with 100 parts by volume of water on each occasion. On being evaporated the chloroform extracts leave behind 32 parts of an oily residue, from which 29.5 parts of heptaethylene glycol monomethyl ether are distilled at 0.005 mm. pressure of mercury and 150° C. in the form of a colorless oil.

25.6 parts of heptaethylene glycol monoethyl ether are dissolved in 35 parts by volume of benzene, and 13.5 parts by volume of benzene sulfochloride are added dropwise in the course of one hour while stirring and cooling to 20–30° C. Before introducing the sulfochloride dropwise, there are added 2 parts of pulverized sodium hydroxide, and then a further 4 parts of sodium hydroxide are added in portions of 1 part each at intervals of 15 minutes. The whole is stirred for a further 2 hours, and then allowed to stand overnight without stirring. 50 parts by volume of water and 25 parts by volume of benzene are then stirred in and the two layers are separated from one another. The aqueous layer is again extracted with 50 parts by volume of benzene. The combined benzene extracts are agitated for 4 hours after the addition of 5 parts by volume of aqueous ammonia of 25 percent strength. 10 parts by volume of caustic soda solution of 10 percent strength are then added, the whole is well agitated, and the benzene layer is separated, and the latter is washed with 10 parts by volume of caustic soda solution of 10 percent strength and with 10 parts by volume of a semi-saturated aqueous solution of sodium chloride. All the aqueous layers are separately extracted with the same 50 parts by volume of benzene. From the combined benzene solutions there are obtained 31.5 parts of the benzene sulfonic acid ester of heptaethylene glycol monomethyl ether in the form of an almost colorless oil.

94 parts of the latter compound are introduced dropwise into a solution of 4.6 parts of sodium in 70 parts by volume of 1,2-propylene glycol at 100° C. The whole is stirred for 3 hours and then heated at 100° C. for 10 hours, during which solid constituents separate out in the reaction mixture. After cooling the mixture, 100 parts by volume of water and 200 parts by volume of chloroform are stirred in, and the chloroform layer is again extracted once by agitation with 100 parts by volume of water. The two aqueous layers are again extracted four times in succession with 100 parts by volume of chloroform on each occasion. The combined chloroform extracts yield 78 parts of an oily crude product, from which there are obtained by distillation under a high vacuum of 0.002 mm. pressure of mercury and at 173° C. 70 parts of heptaethylene glycol-ω-methyl ether-ω′-[2-hydroxy-n-propyl-ether(1)] in the form of a colorless oil.

In an analogous manner nona-ethylene-glycol-ω-methyl ether-ω′-[2-hydroxy-n-propyl ether-(1)] can be obtained from nona-ethylene glycol methyl ether, which latter can be obtained from the above described benzene sulfonic acid ester of heptaethylene glycol methyl ether as follows:

95 parts of the benzene sulfonic acid ester of heptaethylene glycol monomethyl ether are introduced dropwise in the course of 2 hours at 100° C. while stirring, into a solution of 4.6 parts of sodium in 70 parts by volume of diethylene glycol. The whole is then maintained at 100° C. overnight and allowed to cool. 100 parts by volume of water and 200 parts by volume of chloroform are then stirred in, and the two layers are separated from one another. The aqueous layer is extracted four times with 100 parts by volume of chloroform on each occasion, and each chloroform extract is washed with the same 100 parts by volume of water. The combined chloroform solutions, upon evaporation, yield 83 parts of a residue from which 70 parts of nona-ethylene glycol monomethyl ether are distilled under a high vacuum of 0.002 mm. pressure of mercury at 185° C. in the form of a colorless oil.

*Example 2*

By reesterifying 2.21 parts of para-(n-butylamino)-benzoic acid ethyl ester with 8.7 parts of octaethylene glycol-ω-methyl ether-ω′-[2-hydroxy - 3 - ethoxy - propyl ether-(1)] by the method described in Example 1, there is obtained the ester of para-(n-butylamino)-benzoic acid with octa-ethylene glycol-ω-methyl ether-ω′-[2-hydroxy-3-ethoxy-propyl ether-(1)] of the formula

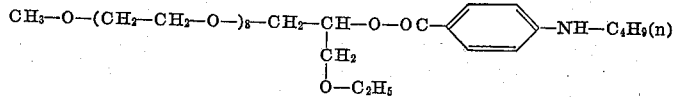

in the form of a pale yellow oil, which dissolves well in water, ethanol and chloroform. An aqueous solution of 10 percent strength of this product remains clear at temperatures below 39° C., and when heated to higher temperatures the new ester separates out and redissolves upon cooling.

The octa-ethylene glycol-ω-methyl ether-ω′-[2-hydroxy- 3-ethoxy-propylether-(1)] used as starting material in this example may be prepared as follows:

2.4 parts of sodium are dissolved in 41 parts of glycerine-ω-ethyl ether boiling at 118–120° C. under 10 mm. pressure, while stirring, at 100° C. in a flask fitted with stirring mechanism and with the exclusion of moisture. 52.4 parts of the benzene sulfonic acid ester of octaethylene glycol monomethyl ether (prepared by reacting the benzene sulfonic acid ester of penta-ethylene glycol monomethyl ether with triethylene glycol, and reacting the resulting octa-ethylene glycol monomethyl ether boiling at 165° C. under 0.005 mm. pressure with benzene sulfonic acid chloride in a manner analogous to that described in Example 1 are added dropwise at 95–105° C. while stirring. After heating the mixture at 100–110° C. overnight, it is cooled and washed with 100 parts by volume of chloroform and 50 parts by volume of water in a separating funnel. In a second and third separating funnel are placed 12.5 parts by volume of water. After agitation the chloroform layer from the first funnel is introduced into the second funnel and then into the third funnel, and the three aqueous layers are agitated three times more with 100 parts by volume of chloroform on each occasion. The combined chloroform solutions are dried with sodium sulfate and evaporated. After drying the residue at 100° C. under 10 mm. pressure of mercury, there are obtained 49.9 parts of a pale brown oily product. The latter is distilled in a high vacuum and the greater part passes over at 195–215° C. under 0.01 mm. pressure, and from the latter there are obtained by redistillation 34 parts of octaethylene glycol-ω-methyl ether-ω'-[2-hydroxy-3-ethoxy-propyl ether-(1)] boiling at 207–211° C. under 0.01 mm. pressure, in the form of a colorless water-soluble oil.

*Example 3*

2.21 parts of para-(n-butylamino)-benzoic acid ethyl ester are transesterified with 14 parts of heptaethylene glycol - ω:ω'-di - [2 - hydroxy-n-propyl-ether(1)] in the presence of a catalytic quantity of sodium alcoholate at 110–115° C. in a stream of xylol vapour in vacuo according to the method described in Example 1. The crude product is distributed several times between benzene and a 2 N-solution of sodium carbonate, 5.5 parts of ester being obtained from the benzene solution by evaporation and drying in vacuo.

For the purpose of purification, 4.6 parts of the ester are distributed in a separating funnel between 25 parts by volume of ether and 50 parts by volume of water. 25 parts by volume of ether each are put in a second and third separating funnel respectively, and 50 parts by volume of benzene each in a fourth and fifth separating funnel respectively. The water layer is extracted in succession in these separating funnels, whereupon all the organic layers are extracted in succession twice with 50 parts by volume of water saturated with ether each time. From the combined and dried benzene solutions there are obtained by evaporating and drying at 100° C. in vacuo 3.1 parts of the monoester of para-(n-butylamino) benzoic acid with hepta-ethyl glycol-ω:ω'-di-[2-hydroxy-n-propyl ether-(1)] of the formula

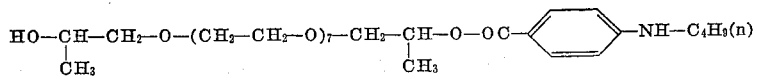

as a pale yellow oil which is readily soluble in isopropanol and chloroform. From an aqueous solution of 10% strength the ester is separated on heating to a temperature above 440° C., and, on cooling, dissolves again completely.

The hepta-ethylene glycol-ω:ω'-di-[2-hydroxy-n-propyl ether-(1)] used as starting material in this example can be prepared as follows:

800 parts by volume of benzene sulfonyl chloride and 400 parts of pulverized sodium hydroxide are added uniformly in the course of 2½ hours at a temperature of 30–35° C., with occasional cooling and stirring, to 280 parts by volume of tri-ethylene glycol dissolved in 2000 parts by volume of benzene. The mixture is stirred for another 24 hours and then allowed to stand for 2 days. By adding it to 2500 parts by volume of water the reaction mixture separates into 2 layers. The two layers are separated and the aqueous layer is extracted with 400 parts by volume of benzene. The combined benzene solutions are mixed with 200 parts by volume of aqueous ammonia of 25% strength and then mechanically agitated for 4 hours. 200 parts by volume of a 2 N-solution of caustic soda are added and the whole is agitated for a short time. The aqueous layer is separated and extracted with 400 parts by volume of benzene. The two benzene layers are washed in succession with 200 parts by volume of a 2 N-solution of caustic soda and 200 parts by volume of water. From the combined benzene solutions dried with sodium sulfate there are obtained by evaporating the benzene under reduced pressure 820 parts of crude dibenzene-sulfonic acid ester of triethylene glycol which are recrystallized from 10,000 parts by volume of methyl alcohol. By cooling slowly to −17° C. there are obtained 690 parts of crystalline diester of melting point 38–39° C.

215 parts of this product are liquefied by mixing with a little ether and are then added dropwise in the course of 4 hours at 110° C. bath temperature, while stirring with the exclusion of moisture, to 350 parts by volume of a 2.85 N-solution of sodium diethylene glycolate in diethylene glycol. The mixture is heated for 24 hours at 100–110° C.

The cooled reaction mixture is extracted exhaustively with ether. 442 parts of an oily, almost colorless extract and 200 parts of crystalline sodium benzene sulfonate are obtained. After adding 100 parts by volume of aqueous ammonia of 25% strength to the extract, the mixture is allowed to stand overnight and is then slowly heated to 100° C. It is heated for 2 hours at 100° C. and then evaporated to dryness at a water jet vacuum. 422 parts of a nearly colorless oil remain which are allowed to flow through an exchanger column of a mixed bed consisting of 100 parts by volume of Amberlite JR–120 and JRA–410. After exhaustive elution with water, there are obtained by evaporating the water under water jet vacuum 436 parts of only slightly discolored oil from which 303 parts of tri-ethylene glycol are distilled off in high vacuum, and 104 parts of hepta-ethylene glycol at 157° C. under 0.008 mm. pressure of mercury. Finally, 16 parts of dodeca-ethylene glycol can be separated off at 225° C. under 0.03 mm. of pressure as the chief by-product with a higher boiling point from 3 parts of distillation residue.

32.7 parts of hepta-ethylene glycol are dissolved in 100 parts by volume of benzene and in the course of half an hour are mixed uniformly with 40 parts by volume of benzene sulfonyl chloride and 20 parts of pulverized sodium hydroxide while stirring vigorously and cooling at 25–30° C. The whole is stirred for another 3 hours and the temperature is allowed to rise to a maximum of 40° C. by removing the cooling system.

After allowing the mixture to stand overnight, the salts are dissolved by stirring in 120 parts by volume of water. The two layers are separated. The aqueous layer is extracted with 20 parts by volume of benzene. The combined benzene solutions are mixed with 10 parts by volume of aqueous ammonia of 25% strength and agitated mechanically for 4 hours. 10 parts by volume of a 2 N-solution of caustic soda are then added and the whole is agitated again for a short time. The aqueous layer is separated and extracted with 20 parts by volume of benzene. The two benzene layers are washed consecutively by agitation with 10 parts by volume of a 2 N-solution of caustic soda and three times with 10 parts by volume of water each time. From the combined benzene solutions dried with sodium sulfate there are obtained by evaporating the benzene in partial vacuum 58 parts of oily, slightly yellowish di-benzene sulfonic acid ester of hepta-ethylene glycol.

56.7 parts of this diester in 100 parts by volume of absolute benzene are added dropwise in the course of 1 hour at 80° C. bath temperature to 70 parts by volume of 2.85 N-sodium-1,2-propylene glycolate solution in 1,2-propylene glycol with stirring and exclusion of moisture. The mixture is heated for 20 hours with gentle stirring at 80° C.

After cooling, the precipitated sodium benzene sulfonate is dissolved by stirring in 75 parts by volume of water and the aqueous layer is separated off. It is extracted three times with 250 parts by volume of chloroform each time. By evaporating the combined, dried chloroform solutions, 48.2 parts of crude product are obtained which, after being mixed with 50 parts by volume of aqueous ammonia of 25% strength, is allowed to stand for two days and then slowly heated to 80° C. The water and the ammonia are suction-filtered under the water jet vacuum and the residue is run through an ion exchanger consisting of 25 parts by volume of Amberlite JR–120 and 50 parts by volume of Amberlite JRA–410. The column is washed exhaustively with water and by evaporating the eluates 44 parts of a brownish oil are obtained which is distilled under 0.01 mm. of pressure to yield 32 parts of hepta - ethylene glycol - ω:ω' - di - [2-hydroxy-n-propyl ether-(1)] in the form of a colorless oil boiling at 182° C.

Example 4

110 parts of commercial, dry polyethylene glycol monomethyl ether of an average molecular weight of 550 are heated with 0.2 part of potassium hydroxide in an autoclave fitted with stirring means at 170–180° C. in an atmosphere of nitrogen. 52 parts of 1,2-propylene oxide are pressed in slowly with nitrogen. Condensation is completed after a short time, which can be seen from the decrease in pressure produced by the consumption of the propylene oxide. For the purpose of purification, the brown contents of the autoclave, which weigh 161.6 parts after heating for half an hour at 100° C. under 10 mm. pressure of mercury are dissolved in 750 parts by volume of water and extracted with 8 parts of charcoal for 3 hours. The mixture is filtered, the residue washed with 120 parts by volume of water and the filtrates mixed with 100 parts of sodium chloride. By exhaustive extraction with cholorform there are obtained after evaporating and drying at 100° C. in vacuo 157 parts of a pale yellow oil whose molecular weight amounts to 810 on the basis of a hydroxyl determination. The polyether alcohol so obtained is a mixture of different polymerization steps of the formula

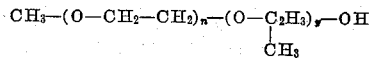

in which $n$ has an average value of 12 and $n+y$ one of 16.

162 parts of this product are transesterified with 22.1 parts of para-(n-butylamino)-benzoic acid ethyl ester in the presence of a catalytic quantity of sodium methylate in a stream of xylol vapour in the manner described in Example 1. From the crude product there is obtained by distributing it several times between benzene and saturated sodium bicarbonate solution on evaporating the benzene solution the new ester mixture of the formula

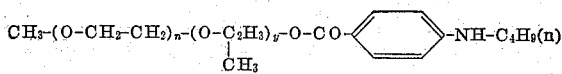

in almost quantitative yield and having an average molecular weight of 985 in the form of a faintly yellow oil. The turbidity point of an aqueous solution of 10% strength lies at 38° C.

The new ester mixture can be divided into hydrophillic and hydrophobic portions, for example in the following way:

2.12 parts are agitated with 10 parts by volume of ether and 20 parts by volume of water. After separation, there is obtained by evaporating the ether layer 0.80 part of the hydrophobic portions which have a turbidity point of 27° C. The aqueous layer contains the hydrophil portions having a turbidity point of 47° C.

Example 5

17 parts of 2-(α:α'-dimethoxy-iso-propoxy)-ethanol of the formula

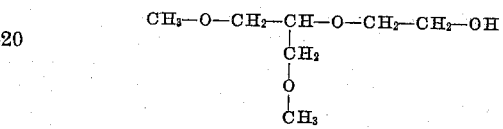

of boiling point 107° under 14 mm. pressure, prepared by reacting α:α'-dimethoxy-iso-propyl-benzene sulfonate with monosodium ethylene glycolate dissolved in ethylene glycol at 90–100° C., are heated with 0.03 part of sodium hydroxide in an autoclave fitted with stirring means in an atmosphere of nitrogen at 160–170° C. 50 parts of ethylene oxide are then pressed in slowly with nitrogen. After cooling, the reaction mixture is dissolved in 250 parts by volume of water and agitated with a little active charcoal. The filtered aqueous solution is extracted with chloroform and the cholorform solution evaporated. There are obtained 65 parts of an almost colorless oil which has an average molecular weight of 640 on the basis of a hydroxyl determination. The polyether alcohol thus obtained is a mixture of different polymerization steps corresponding to the formula

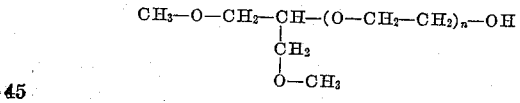

in which $n$ has an average value of 12.

13 parts of this polyether alcohol and 2.2 parts of para-(n-butylamino)-salicylic acid methyl ester are heated in a round bottomed flask in a bath of 200° C. Simultaneously 25 parts by volume of anhydrous toluene are run in at a uniform rate under the surface of the liquid, and the vapours evolving are condensed in a descending condenser which is connected with a receiver sealed with a drying pipe. The contents of the flask are then mixed with 0.05 part of sodium methylate dissolved in 0.1 part of methanol, and then, while heating the mixture in a bath of 200° C. for 4 hours, 150 parts by volume of anhydrous toluene are run in in the manner described above.

After cooling, the reaction product is dissolved in 100 parts by volume of benzene and freed from acid components by extraction with 2 N-aqueous caustic soda solution several times. The aqueous layers are extracted with benzene and then exhaustively extracted with chloroform for the purpose of regenerating the unchanged polyether alcohol. From the combined dried benzene solutions there are obtained on evaporating under reduced pressure 8.6 parts of the ester of para-(n-butylamino)-salicylic acid with a polyethylene glycol mono-α:α'-dimethoxy-isopropyl ether of the formula

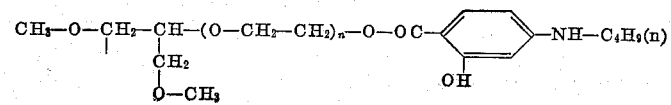

in the form of a brownish oil and having an average molecular weight of 850, $n$ being about 12.

8.4 parts of the new, oily, practically colorless ester mixture of the formula

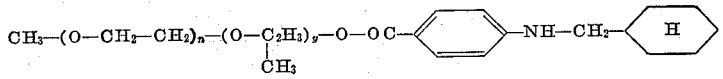

For the purpose of purification the oil is freed from water-insoluble components by exhaustive extraction at 40–50° C. with a gasoline fraction (boiling point 80–100° C.). The new ester is so obtained in the form of an almost colorless, viscous oil which dissolves to form a clear solution in water below 40° C. but is practically insoluble in aliphatic hydrocarbons.

Example 6

8.3 parts of N-hexyl bromide are stirred with 33 parts of para-aminobenzoic acid ethyl ester and with a little copper powder for 12 hours at 130–140° C. and, after cooling, digested with 300 parts by volume of ether. After filtering off the insoluble components, the ether solution is extracted several times with N-hydrochloric acid and evaporated. The residue crystallizes on cooling. By recrystallization from a little ethanol and from a mixture of benzine and benzene (1:1) there is obtained the para-hexylamino benzoic acid ethyl ester melting at 89° C.

2.5 parts of this product are transesterified with 15 parts of hepta - ethylene - glycol - ω:ω' - di - 2 - hydroxy-n-propyl ether-(1) in the presence of a catalytic quantity of sodium methylate and worked up as described in Example 3. 4 parts of the mono-ester of para-(n-hexylamino)-benzoic acid with heptaethylene-glycol-ω:ω'-di-2-hydroxy-n-propyl ether-(1) of the formula

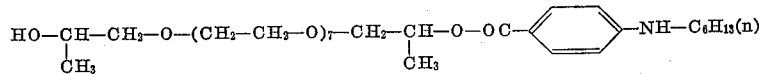

are obtained as an almost colorless, viscous oil. The new ester dissolves readily in alcohol and acetone, also in water at a temperature below 40° C.

Example 7

85 parts of commercial polyethylene glycol monomethyl ether of an average molecular weight of 550, 17.4 parts of propylene oxide-(1,2) and 0.1 part of potassium hydroxide (finely pulverized) are heated in an autoclave fitted with stirring means at 155–160° C. under nitrogen. The pressure rises first to 3 atmospheres gauge pressure and drops after a short time to 0. The whole is stirred for another half hour at 155–160° C. The contents of the autoclave are then dried at 90–100° C. under 10–15 mm. pressure of mercury for an hour, 99.6 parts of a pale brown oil being obtained. For the purpose of purification 750 parts are dissolved in water, agitated with 5 parts of active charcoal, filtered and flushed with a little water. The filtrate is extracted exhaustively with chloroform, 96 parts of an oil clear as water being obtained. The latter has an average molecular weight of 674 on the basis of a hydroxyl determination and has the following constitution $$CH_3-(O-CH_2-CH_2)_n-(O-C_3H_6)_y-OH$$
$$\phantom{CH_3-(O-CH_2-CH_2)_n-(O-}CH_3$$

in which $n > y$.

11 parts of the above product are reacted with 2.61 parts of para-hexahydrobenzyl-amino benzoic acid ethyl ester in the presence of a catalytic quantity of sodium methylate in the manner described in Example 1. After working up as described in Example 1, there are obtained having an average molecular weight of 880 and which is soluble in chlorobenzene and also in water at a temperature below 50° C.

The para-hexahydrobenzylamino benzoic acid ethyl ester used as intermediate can be obtained in the following manner: In a flask fitted with stirring means, dropping funnel and reflux condenser, 16.5 parts of para-aminobenzoic acid ethyl ester, 24 parts of glacial acetic acid, 100 parts by volume of benzene and 26 parts of zinc dust (commercial) are stirred at the boil. 13.8 parts of hexahydrobenzaldehyde dissolved in 25 parts by volume of benzene are then run in in the course of an hour. After stirring at the boil for 4 hours the mixture is filtered hot and rinsed out of its container with a hot mixture of benzene and glacial acetic acid 5:1. The cooled filtrate is rendered alkaline with aqueous ammonia of 12% strength, separated off in the separating funnel and the benzene layer washed with water, then with 2 N-sodium carbonate solution and then with water again. On evaporating the benzene solution a crystalline residue is obtained from which by recrystallization from 70 parts by volume of ethanol 22 parts of pure para-hexahydrobenzylamino benzoic acid ethyl ester are obtained in the form of colorless crystals melting at 81° C. The new ester can also be recrystallized from benzine.

Example 8

A product very similar to the ester mixture described in Example 7 is obtained when para-cyclohexylamino benzoic acid ethyl ester is used instead of para-hexahydrobenzylamino benzoic acid ethyl ester. The new ester mixture is oily and practically colorless, dissolves in water below 50° C. and has the following constitution:

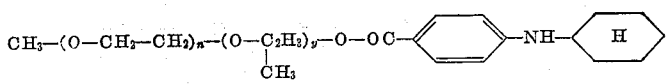

Average molecular weight: 866.

The para-cyclohexylamino benzoic acid ethyl ester used as starting material can be prepared as follows:

11.4 parts of bromocyclohexane and 46 parts of para-aminobenzoic acid ethyl ester are stirred for 14 hours at 120–130° C. and then for another 3 hours at 140–150° C. The reaction mass, in which crystals have separated, is digested with 400 parts by volume of ether. After filtering, the mixture is extracted four times with 250 parts by volume of N-hydrochloric acid and once with 250 parts by volume of saturated sodium hydrogen carbonate solution, and the aqueous solutions are washed with a further 300 parts by volume of ether. From the combined and dried ether solutions there are obtained by evaporation 5.1 parts of dry residue. The pure para-cyclohexylamino benzoic acid ethyl ester is obtained by distillation and recrystallization from a little of a mixture of ethanol and water (5:1); boiling point=215–218° C. under 10 mm. of pressure; melting point=57–58° C.

Example 9

62 parts of a polyethylene-glycol-mono-ethyl ether mixture, having an average molecular weight of 620, are heated with 17.6 parts of glycide methyl ether and 0.1 part of pulverized potassium hydroxide at 180–190° C. for 4–5 hours in an atmosphere of nitrogen in an autoclave fitted with stirring means. The contents of the autoclave, dried at 100° C. under reduced pressure, weigh 79 parts. The contents are dissolved in 400 parts by volume of water and agitated for 1 hour with 3.5 parts of active charcoal. From the filtered solution there are obtained by exhaustive extraction with chloroform 76 parts of the colorless, oily polyethylene glycol derivative having an average molecular weight of 760 (calculated on the basis of hydroxyl determination) of the formula

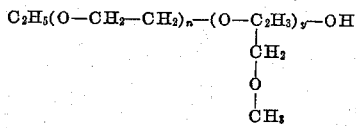

in which $n > y$.

14 parts of this product are transesterified with 2.7 parts of para-(2-butoxyethylamino)-benzoic acid ethyl ester in the presence of a catalytic quantity of sodium ethylate and worked up according to the method described in Example 1. There are obtained 8.5 parts of the new, practically colorless, oily ester mixture having an average molecular weight of 1009 of the formula

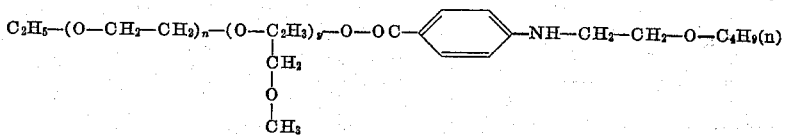

in which $n > y$.

This ester mixture is readily soluble in methanol, methyl-ethyl ketone, and also in water at a temperature below 50° C.

The para-(2-butoxyethylamino)-benzoic acid ethyl ester used as starting material can be prepared as follows:

118 parts of ethylene glycol monobutyl ether in 450 parts by volume of benzene are slowly mixed at 20–30° C. simultaneously with 20 parts of pulverized sodium hydroxide and 45 parts by volume of benzene sulfonyl chloride. 135 parts by volume of benzene sulfonyl chloride together with 52 parts of pulverized sodium hydroxide are then slowly added. The whole is stirred for two hours and then allowed to stand overnight. It is then mixed with 450 parts by volume of water and the aqueous layer is separated off; the later is extracted with 100 parts by volume of fresh benzene. The combined benzene solutions are agitated with 50 parts by volume of concentrated ammonia for 4 hours, 100 parts by volume of 2 N-caustic soda solution are added and the whole is then agitated again for 10 minutes. The aqueous layer is separated off, the benzene solution is washed with 100 parts by volume of 2 N-caustic soda solution and then with 100 parts by volume of water. By evaporating the benzene solution and drying the residue at 100° C. under reduced pressure there are obtained 249 parts of 2-butoxyethyl benzene sulfonate in the form of a pale yellow oil. 8.5 parts of this product are stirred with 22 parts of para-aminobenzoic acid ethyl ester at 100–105° C. for 2 hours and then for 1½ hours at 115–120° C. Shortly after the reaction temperature has been reached, colorless crystals begin to precipitate. After cooling, the mixture is stirred with 100 parts by volume of ether, filtered off from the insoluble benzene sulfonate of the para-amino benzoic acid ethyl ester and rinsed out of its container with ether. The ether solution is washed 5 times with 50 parts by volume of 1 N-hydrochloric acid each time and once with 50 parts by volume of 3 N-potassium hydrogen carbonate solution. By evaporation of the dried ether solution there are obtained 8.24 parts of a red-brown oil which distils as a colorless oil at 140–142° C. under 0.01 mm. of pressure. The latter consists of pure para-(2-butoxy-ethylamino)-benzoic acid ethyl ester.

The following examples are illustrative of pharmaceutical preparations employing the novel compounds:

Example 10.—Syrup

Ester of para-n-butylamino-benzoic acid with hepta-ethylene-glycol-ω-methyl ether-ω'-[2-hydroxy-n-propyl ether-(1)] of the formula shown in column 4 _____ mg__ 5.00
Sugar _____ mg__ 380.00
Para-hydroxybenzoic acid ester _____ mg__ 1.20
Sodium-carboxymethyl cellulose _____ mg__ 5.00
Citric acid _____ mg__ 1.25
Oil of lemon _____ mg__ 0.02
Vanillin _____ mg__ 0.02
Banana essence (artificial) _____ mg__ 0.05
Tween 20 (Atlas Powder Company) _____ mg__ 0.10
De-ionized water _____ cc__ To 1.00

The above components are combined in the usual manner for preparing syrups. The syrup is useful as an antitussive, and relieves coughs.

Example 11.—Ampules

Ester of para-n-butylamino-benzoic acid with octa-ethylene-glycol-ω-methyl ether-ω'-[2-hydroxy-3-ethoxy-propyl ether-(1)] of the formula shown in column 6 _____ mg__ 5.00
Sodium chloride _____ mg__ 9.00
Distilled water _____ cc__ Up to 1.00

The solution of the components is prepared in the usual manner, and ampuled under sterile conditoins.

What is claimed is:

1. Esters of benzoic acids, substituted in the para-position by the group Y—NH—, with poly-(1,2)-glycols of the formula:

in which Y represents a member of the group consisting of alkyl, oxa-alkyl, cycloalkyl and cycloalkyl-alkyl radicals, such radicals containing 4 to 7 carbon atoms, and R stands for a member of the group consisting of hydrogen and a lower alkyl radical, and in which formula $n$ stands for a whole number from 8 to 16 and R' in each radical of the formula:

represents a member of the group consisting of hydrogen, lower alkyl and lower alkoxyalkyl, provided that in at least $n/2$, but in at most $n-1$ of these radicals R' represents hydrogen.

2. The ester of the formula

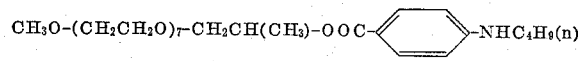

3. The ester of the formula

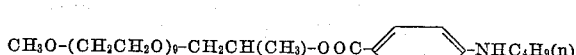

4. The ester of the formula

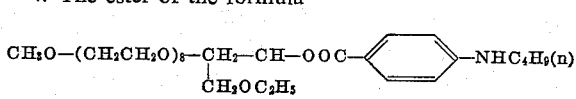

5. The ester of the formula

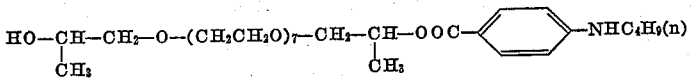

6. The ester of the formula

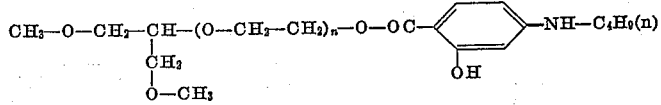

wherein $n$ has an average value of 12.

7. The ester of the formula

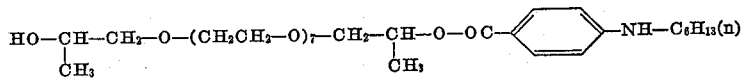

8. The ester of the formula

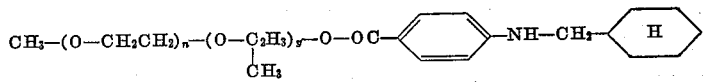

wherein $n > y$ and of average molecular weight 880.

9. The ester of the formula

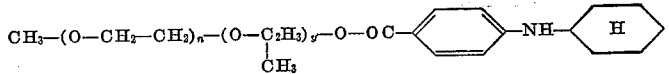

wherein $n > y$ and of average molecular weight 866.

10. The ester of the formula

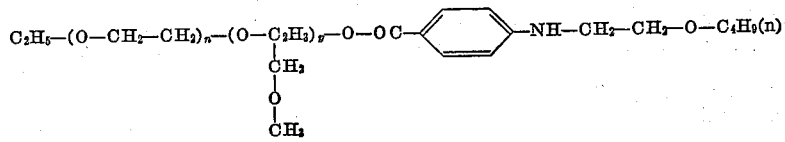

wherein $n > y$ and of average molecular weight 1009.

References Cited in the file of this patent

UNITED STATES PATENTS

| 2,714,607 | Matter | Aug. 2, 1955 |
| 2,714,608 | Matter | Aug. 2, 1955 |
| 2,714,609 | Matter | Aug. 2, 1955 |
| 2,714,610 | Matter | Aug. 2, 1955 |

FOREIGN PATENTS

| 728,583 | Great Britain | Apr. 20, 1955 |

UNITED STATES PATENT OFFICE
Certificate of Correction

Patent No. 2,857,417                                                  October 21, 1958

Max Matter et al.

It is hereby certified that error appears in the printed specification of the above numbered patent requiring correction and that the said Letters Patent should read as corrected below.

Column 7, line 69, for "440° C.," read *44° C.*; column 14, lines 73 to 75, claim 4, the formula should appear as shown below instead of as in the patent—

Signed and sealed this 27th day of January 1959.

[SEAL]

Attest:
KARL H. AXLINE,
*Attesting Officer.*

ROBERT C. WATSON,
*Commissioner of Patents.*